United States Patent [19]

Journée

[11] 3,961,395

[45] June 8, 1976

[54] DOUBLE STRIP WINDSCREEN-WIPER BLADE

[76] Inventor: Paul Journée, Chateau de Reilly, 60 Reilly par, Chaumont-en-Vexin, France

[22] Filed: Jan. 30, 1975

[21] Appl. No.: 545,384

[30] Foreign Application Priority Data
Jan. 30, 1974  France .............................. 74.03100

[52] U.S. Cl. .......................... 15/250.36; 15/250.42
[51] Int. Cl.² ........................................ B60S 1/38
[58] Field of Search 15/250, 250.32, 250.36–250.42, 15/145

[56] References Cited
UNITED STATES PATENTS

| 1,112,793 | 10/1914 | Heineman | 15/250.29 |
| 1,339,241 | 5/1920 | Trip | 15/250.32 X |
| 1,706,053 | 3/1929 | Bussinger | 15/245 |
| 2,230,489 | 2/1941 | Grossfeld et al. | 15/245 |
| 2,852,798 | 9/1958 | Grossfeld | 15/245 |

FOREIGN PATENTS OR APPLICATIONS

| 567,081 | 12/1923 | France | 15/245 |

*Primary Examiner*—Peter Feldman
*Attorney, Agent, or Firm*—Bacon & Thomas

[57] ABSTRACT

The invention pertains to a windscreen-wiper blade having a double edged squeegee, one edge being designed to be effective in winter use and the other, in summer conditions.

4 Claims, 5 Drawing Figures

DOUBLE STRIP WINDSCREEN-WIPER BLADE

Whatever the type of windscreen-wiper blade or the nature and shape of the surface to be cleaned, and elastic squeegee, generally of natural or synthetic rubber, is used, interlocked with a support fixed to the end of an oscillating arm.

It is well-known that this elastic squeegee undergoes sometimes considerable physical alteration, depending on temperature differences which may be appreciable, both because of variations in the atmospheric conditions and because of differences in the speed of the vehicle, i.e. in the relative movement between the ambient air and the squeegee.

Generally speaking, it may be considered that this rubber squeegee is subjected to substantially different effects in winter and in summer. In winter the rubber tends to harden, due to low temperatures, whilst it tends to soften in high temperatures.

There are therefore two contradictory situations and a compromise cannot be reached by conventional windscreen-wiper blades.

With a view to such compromise, the windscreen-wiper blade according to the invention is characterized by the fact that the rubber squeegee is profiled in such a way as to delimit a lengthwise collar connecting two diametrically opposed wiper strips of different thicknesses, the said squeegee being detachably interlocked with its support adapted to the end of the oscillating arm in such a way that the squeegee can be opportunely displaced 180°, thus bringing into an active position either the thicker or the thinner of the two strips. The said collar linking the two strips of different thickness may be reinforced or not and the reinforcing constituents may be outside and or inside.

The support of the said rubber squeegee with two wiper strips of different thicknesses, and therefore of different stiffness, may be of any convenient shape. In a preferable implementation the said support is made in one sole cast piece forming two elastic, toothed jaws in which the notches are preferably staggered.

Such a double strip windscreen-wiper blade can be made in infinetely variable shapes and sizes.

One non-limitative implementation is described in detail below with reference to the appended drawings in which.

Figure 1:
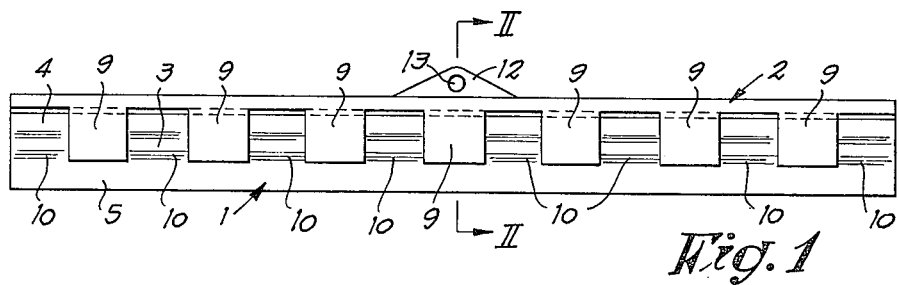
FIG. 1 represents a front view of a double strip windscreen-wiper blade according to the invention.
Figure 2:
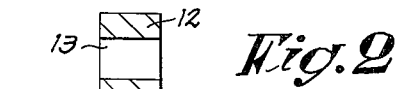
FIG. 2 is a section along the line II—II of FIG. 1.
Figure 3:
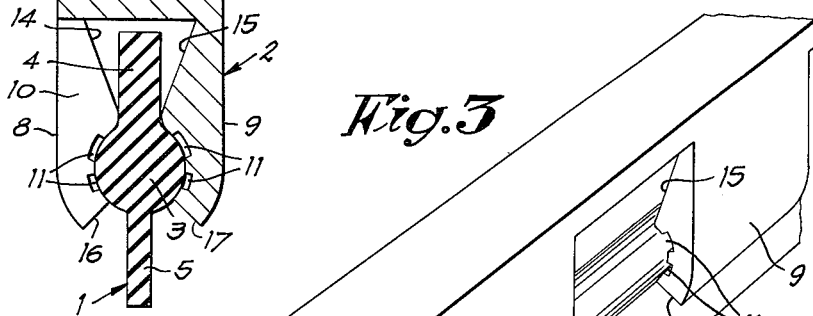
FIG. 3 represents a view in perspective of a section of a windscreen-wiper blade according to the invention.
Figure 4:
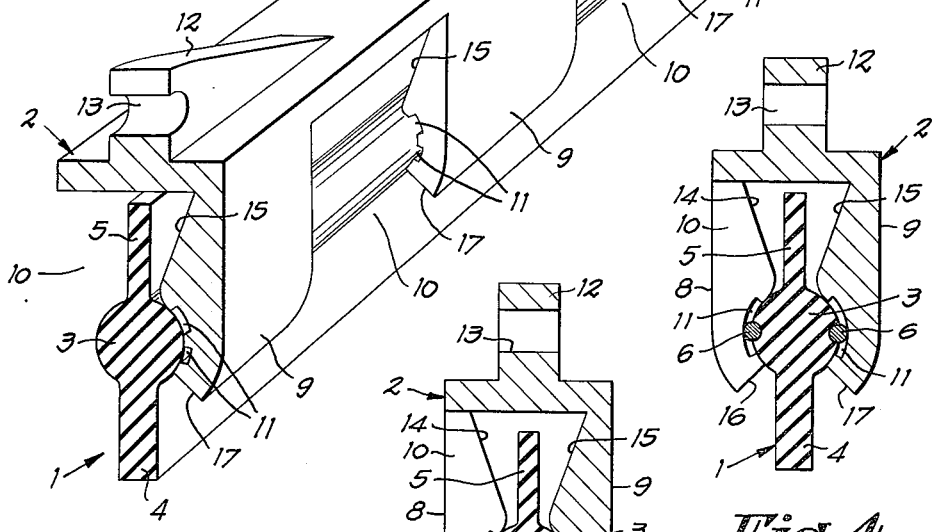
FIGS. 4 and 5 show, in section, two variants of the arrangement in FIG. 2.
Figure 5:
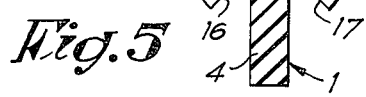

In this implementation, the windscreen-wiper blade according to the invention is made by the combination of two essential constituents, respectively the squeegee 1 and the support or reinforcement 2. In the event, the squeegee 1 is formed by a lengthwise median collar 3 connecting two wiper strips 4–5 of different thicknesses. The thicker strip 5 is, at this juncture, immobilized in the active position whilst the thinner strip 4 is in the retracted position. The said squeegee 1 may comprise outside reinforcements 6 and/or one or more inside reinforcements 7. In the example given, the support 2 is made in one single piece delimiting two toothed jaws 8–9 the notches 10 of which are staggered. The said jaws are profiled so as firmly to engage and grip the collar 3 of the squeegee. In order to increase adherence between the parts in contact, respectively the said collar 3 and the said support 2, the said jaws have grooves 11. In the event, the median part of the said support 2 has a protuberance 12 traversed on either side by a hole 13 by which the said reinforcement 2 can be attached to the oscillating arm (not shown).

To bring the thinner strip 5 into the active position, it suffices to separate the squeegee 1 from its support 2 by pulling; the squeegee is then turned 180° around its longitudinal axis and is then secured again by a thrust effect between the said jaws.

In the implementation shown, the toothed jaws 8–9 are such that they have divergent inside walls, respectively 14–15 and 16–17 so that, if required, the wiper strips 4–5 can be inclined by rotation of the median collar 3. The limits of this tilting are determined by application of the said inside walls 14–15 and 16–17.

The reinforcement or support of the squeegee may be rectilinear or curved, concave or convex, according to the case of the applications.

A skilled person can, of course, modify the devices or processes which have just been described as non-limitative examples, without going beyond the scope of the invention.

What I claim is:

1. A reversible windshield wiper blade assembly comprising:
   an elongated support having means for holding a squeegee blade;
   a squeegee blade of elastomeric material having opposed wiping edge portions and a central thicker portion between said wiping edge portions, said support releasably engaging said central thicker portion to position a selected one of said wiping edge portions in windshield wiping position, said wiping edge portions being of substantially different thickness and therefore of different stiffness whereby said squeegee may be positioned on said support to present either selected wiping edge to a windshield in accordance with different operating conditions.

2. A windshield wiper blade assembly as defined in claim 1 wherein said central portion comprises opposed longitudinal ribs and wherein said holding means on said support comprises opposed jaw recesses respectively embracing said opposed ribs.

3. A windshield wiper blade assembly as defined in claim 2 wherein said support is provided with a plurality of said jaws spaced along said squeegee blade, the jaws on one side thereof being in staggered relation to those on the other side.

4. A windshield wiper blade assembly as defined in claim 2 wherein said opposed jaw recesses define a concave generally cylindrical surface and wherein said opposed ribs define a convex generally cylindrical surface complementary to said concave surface, surfaces of said support adjacent said jaw recesses diverging outwardly therefrom whereby to permit limited rotation of said ribs in said recesses.

* * * * *